United States Patent [19]

Meyers et al.

[11] Patent Number: 5,302,791
[45] Date of Patent: Apr. 12, 1994

[54] DISH COVER FOR USE IN A MICROWAVE OVEN

[75] Inventors: Joel Meyers, Don Mills; Klaus K. P. Kuehn, Pickering, both of Canada

[73] Assignee: Consolaid Inc., Concord, Canada

[21] Appl. No.: 16,548

[22] Filed: Feb. 11, 1993

[51] Int. Cl.⁵ ............................................. H05B 6/80
[52] U.S. Cl. ............................... 219/735; 220/252; 220/318; 220/336; 99/DIG. 14
[58] Field of Search .................. 219/10.55 E, 10.55 F, 219/10.55 R; 99/DIG. 14; 220/336, 315, 318, 252; 426/243, 118

[56] References Cited

U.S. PATENT DOCUMENTS

| | | | |
|---|---|---|---|
| D. 297,298 | 8/1988 | Sarnoff | D7/391 |
| 2,770,389 | 11/1956 | Drakoff | 220/336 |
| 4,585,915 | 4/1986 | Moore | 219/10.55 E |
| 4,644,858 | 2/1987 | Liotto et al. | 219/10.55 E X |
| 4,795,056 | 1/1989 | Meyers | 220/306 |
| 4,801,773 | 1/1989 | Hanlon | 219/10.55 E |
| 4,873,406 | 10/1989 | Connor | 219/10.55 E |
| 4,989,748 | 2/1991 | Parr, Jr. | 219/10.55 E |
| 4,998,000 | 3/1991 | Halloran | 219/10.55 E |
| 5,012,061 | 4/1991 | Lesser | 219/10.55 E |

*Primary Examiner*—Philip H. Leung
*Attorney, Agent, or Firm*—Ridout & Maybee

[57] ABSTRACT

A dish cover for use in a microwave oven has first and second generally semicircular portions which may be fastened to the rim of a dish by latch means and secured to the dish by insertion of the rim between an annular flange and lip extending inwardly from the sidewall of the cover. The flange extends into the space over the dish to serve as a pathway for the return of condensate to the dish during cooking. The cover has handles which may also operate to secure the two halves together. The handles allow for removal of a covered dish from the oven using unprotected hands.

14 Claims, 6 Drawing Sheets

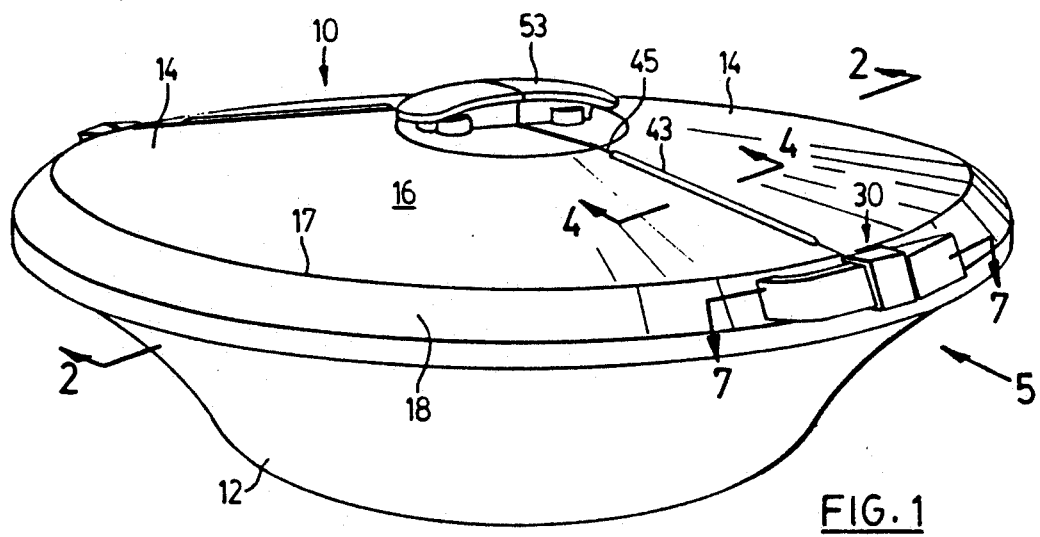
FIG. 1
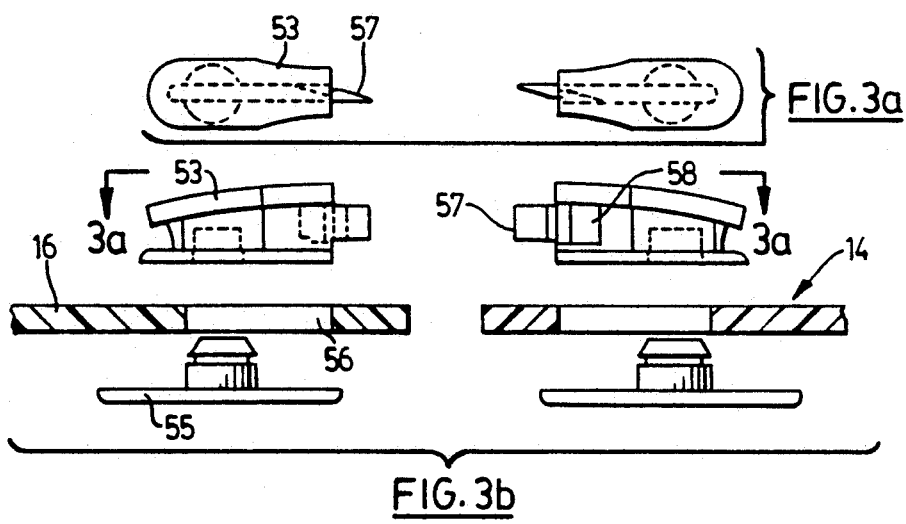
FIG. 3a
FIG. 3b
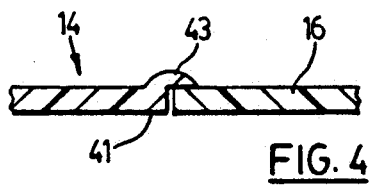
FIG. 4

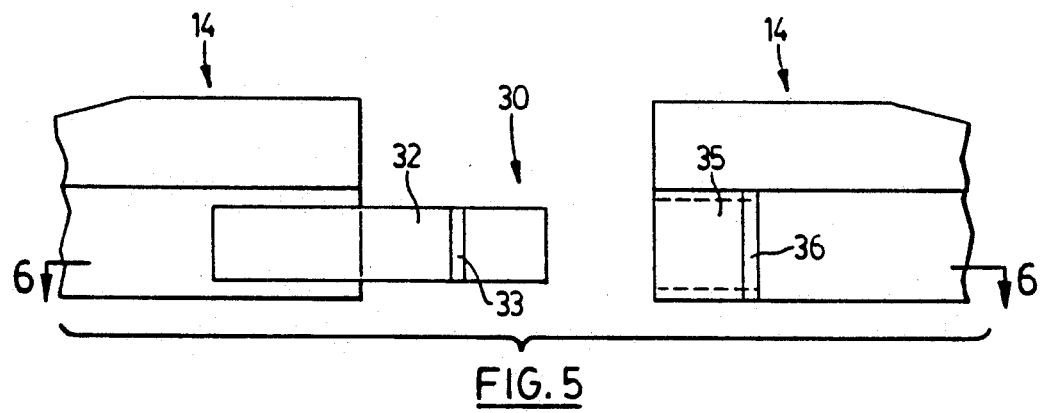
FIG. 5
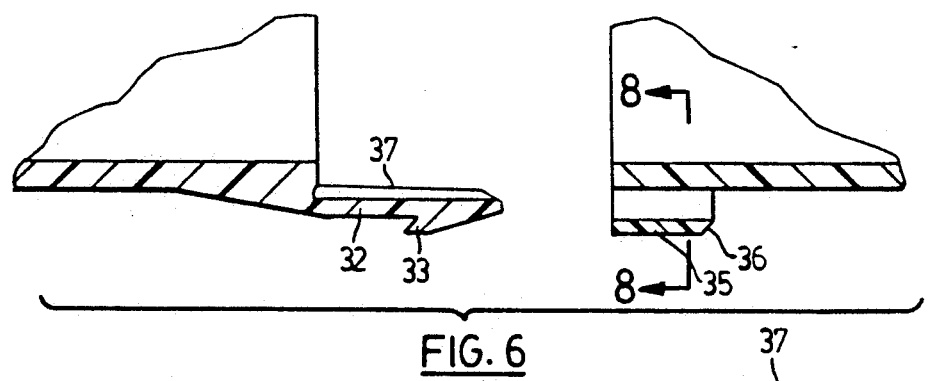
FIG. 6
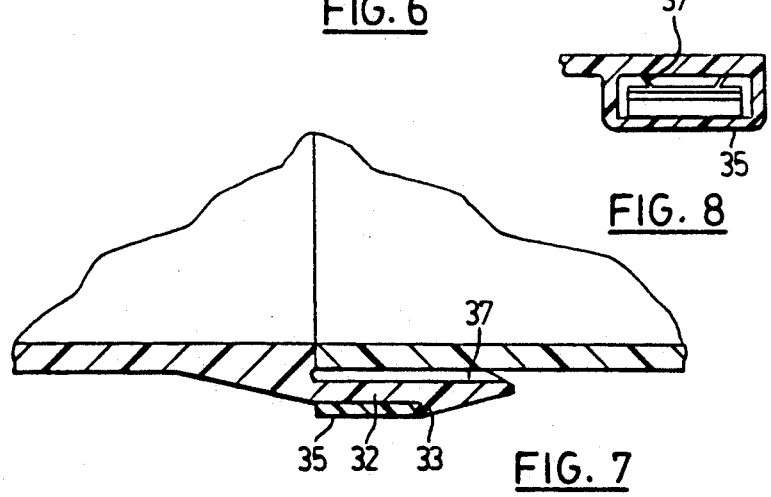
FIG. 8
FIG. 7

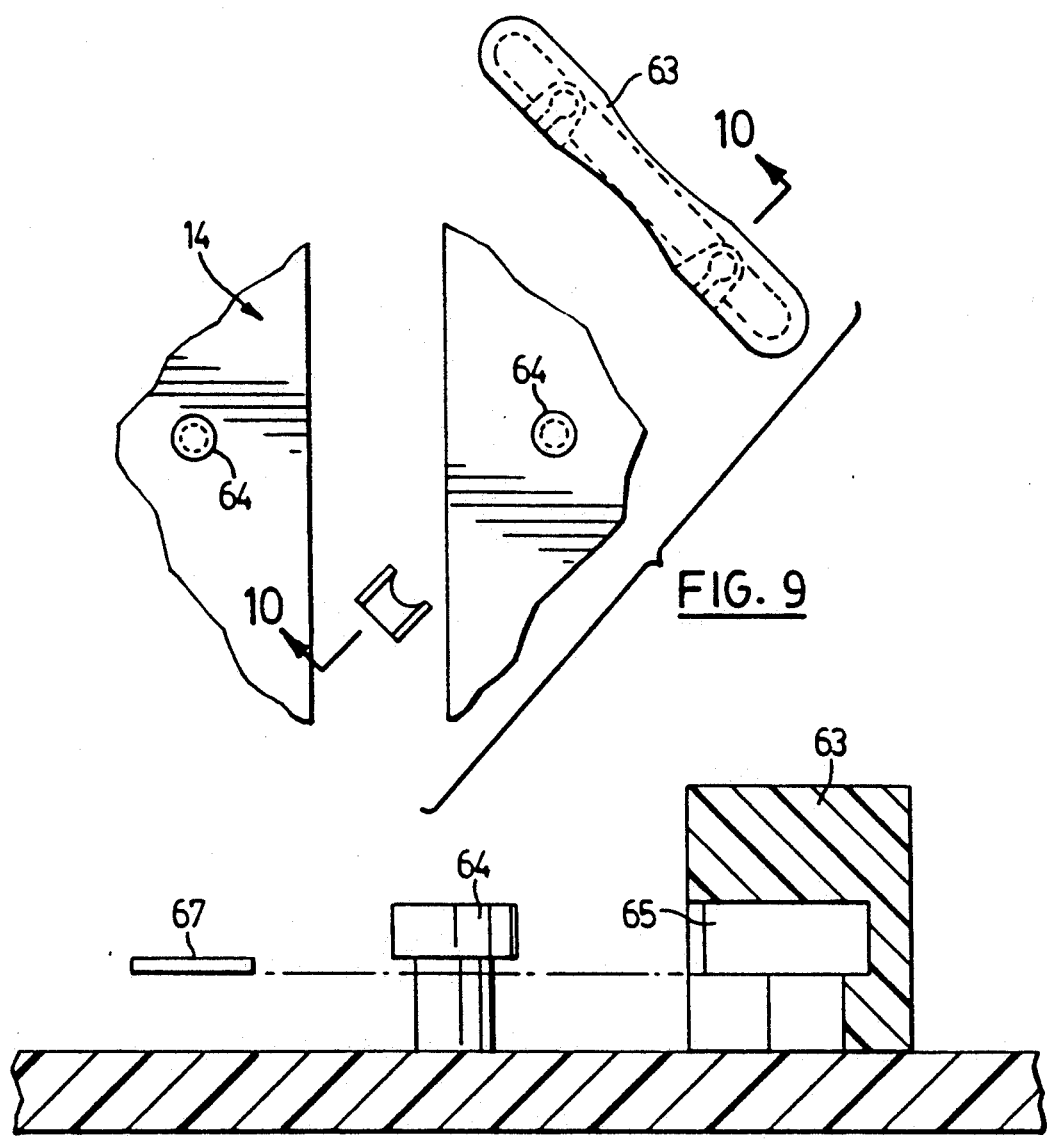
FIG. 9
FIG. 10
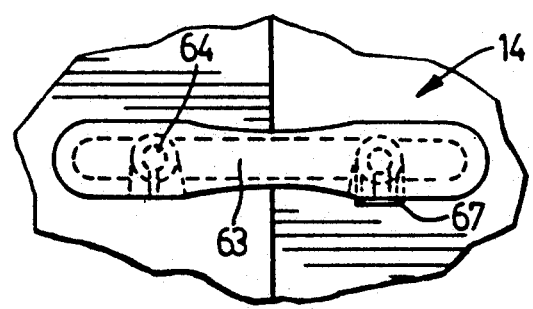
FIG. 11
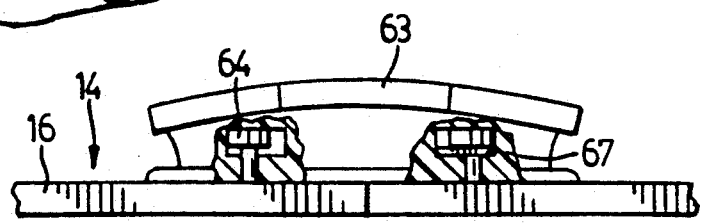
FIG. 12

DISH COVER FOR USE IN A MICROWAVE OVEN

The invention is a dish cover for use in a microwave oven.

As microwave ovens gain wider use in family kitchens, the need for accessories specific to microwave cooking conditions has been felt in the marketplace. Because microwave cooking causes a rapid heating of foods, sputtering frequently occurs due to localized steam build-up in the food being cooked. Additionally, the cooked food often heats the dish containing it in the microwave oven to a temperature which is too hot to handle with unprotected hands. Escaping steam from food being cooked in a microwave oven is undesirable to the extent that it causes condensation on the inner walls of the oven and provides a cooked food which is unnecessarily desiccated.

The invention addresses various problems encountered in microwave cooking and satisfies the need for a device which enhances the benefits provided by this fairly new cooking method. The invention provides a dish cover having two generally semicircular portions which may be joined about the rim of a dish so that the cover is fastened to the dish. Each semicircular portion of the cover has a sidewall depending from its semicircular edge, which sidewall has a lower inwardly extending lip and an inwardly extending flange positioned between the lip and the top surface. The space defined between the flange and lip allows the engagement of the cover with the rim of the dish. The flange is sized to extend slightly into the space above the dish and combines with the inner surfaces of the top and side to provide a pathway for directing condensate back into the dish. A vent is provided through the top surface of the cover to allow pressure equalization between the interior and exterior of the covered dish, and handle means attached to the cover allow removal of the dish from the oven using bare hands.

BRIEF DESCRIPTION OF THE DRAWINGS

FIG. 1 is a perspective view of a cover of the invention as fastened to a dish.

FIG. 3a is a plan view of a handle means of the invention.

FIG. 3b is an exploded side elevation of the handle shown in FIG. 3a, illustrating a means of assembly of the handle to the cover.

FIG. 4 is a cross sectional view of adjacent cover portions taken at line 4—4 of FIG. 1.

FIG. 5 is a side elevation detail of a latch means for the cover of FIG. 1.

FIG. 6 is a cross sectional detail of the latch means of FIG. 5 taken at line 6—6.

FIG. 7 is cross sectional view of the assembled latch means taken at line 7—7 of FIG. 1.

FIG. 8 is a sectional detail of the latch means taken at line 8—8 of FIG. 6.

FIG. 9 is a plan view of an exploded detail of an alternative handle means for the cover of the invention.

FIG. 10 is a sectional view taken through line 10—10 of FIG. 9.

FIG. 11 is a plan view of the assembled handle of FIG. 9.

FIG. 12 is a side elevation, partly broken away, of the assembled handle of FIG. 11.

The invention is a dish cover for use in a microwave oven. As such, the cover must be made of a microwave compatible material, preferably a thermoplastic. As used herein, the term "dish" refers to any bowl, plate or other food or drink container in association with which the cover of the invention may be used.

Figure 2:
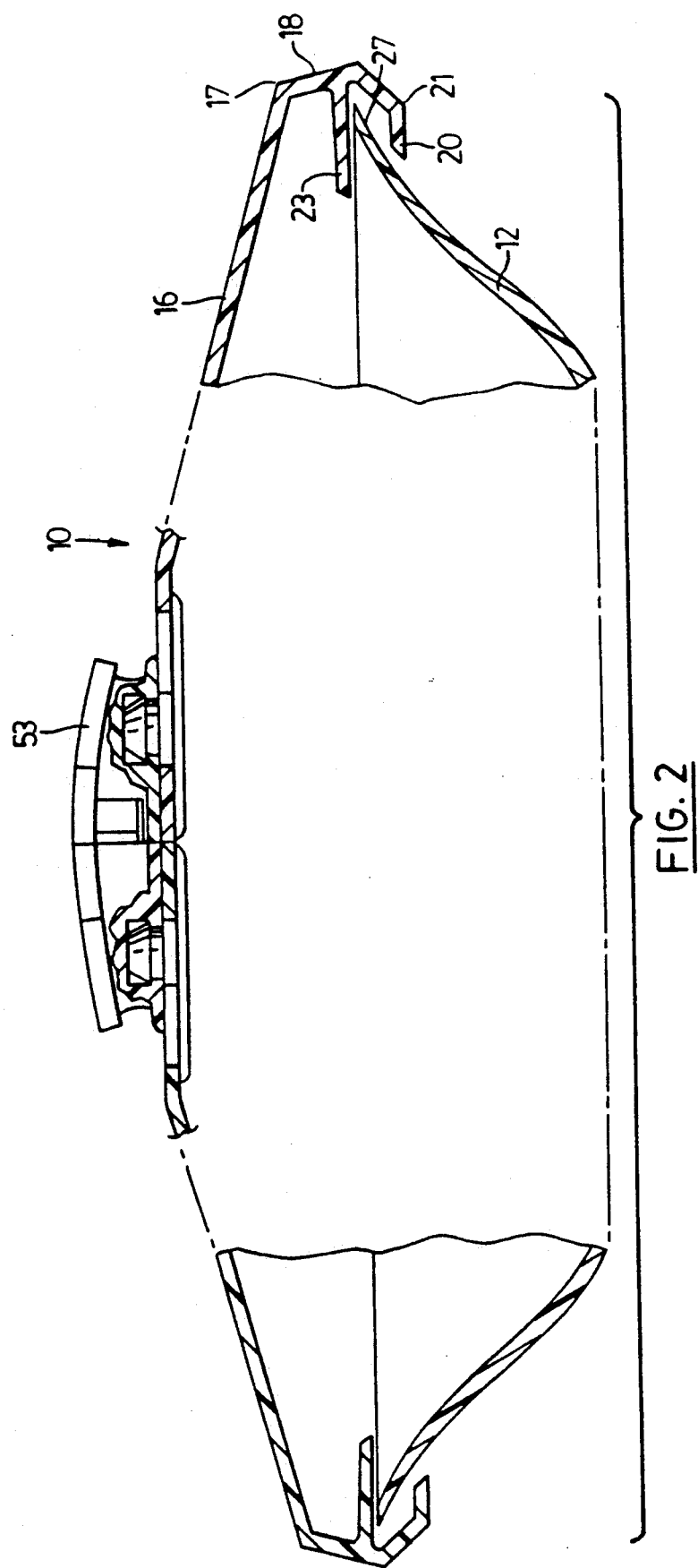
FIG. 2 is a cross sectional view of the cover and dish of FIG. 1.

Referring to FIG. 1, a preferred embodiment of a cover 10 of the invention is shown as attached to a dish 12. The cover 10 comprises two preferably identical generally semicircular portions 14, each portion 14 having a top surface 16 from which semicircular edge 17 depends a sidewall 18. As seen in FIG. 2, the sidewall 18 has an inwardly extending lip 20 along its bottom edge 21. An inwardly extending flange 23 is positioned along the inner surface of the sidewall 18 between the bottom lip 20 and the top surface 16. The space defined between the flange 23 and the lip 20 is sufficient to receive the rim 27 of the dish 12. Preferably, the lip 20 is of sufficient strength to support the weight of a fully loaded dish 12 when the cover 10 is secured to it.

The cover 10 is secured to the dish 12 by latch means 30. Preferred latch means 30 are shown in FIGS. 5-8, and comprise a tongue 32 having a barb 33, the thickness of the tongue 32 should be such to allow it reasonable flexibility. The tongue 32 operates to secure opposing portions 14 of the cover 10 together by passing through a slotted tongue receiving member 35 having a surface 36 for engaging the barb 33. Preferably the tongue 32 is biased away from the sidewall 18 by a pair of ribs 37 (FIG. 8) which act to encourage and maintain the tongue 32 in locking engagement with the receiving member 35. As shown in FIG. 8, the ribs 37 are preferably formed along the length of the tongue 32, with each rib 37 being inset from an edge of the tongue 32 and set at approximately a 45° angle to the surface of the tongue 32.

Figure 14:
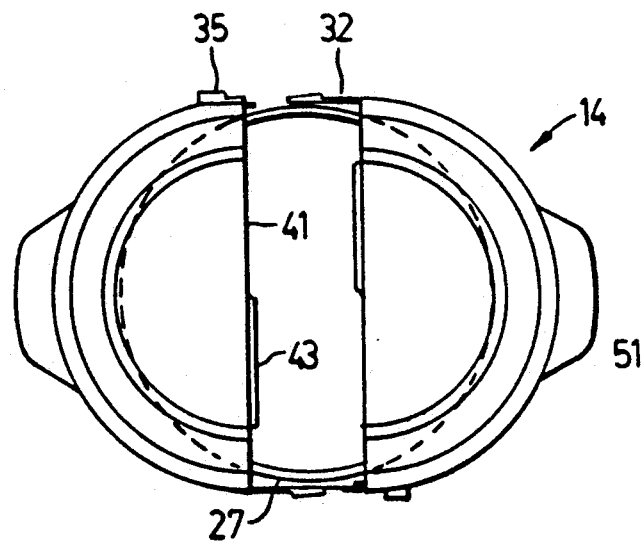
FIGS. 14, 15 and 16 are plan views showing sequentially a preferred method of latching the two cover portions about the rim of a dish.
Figure 15:
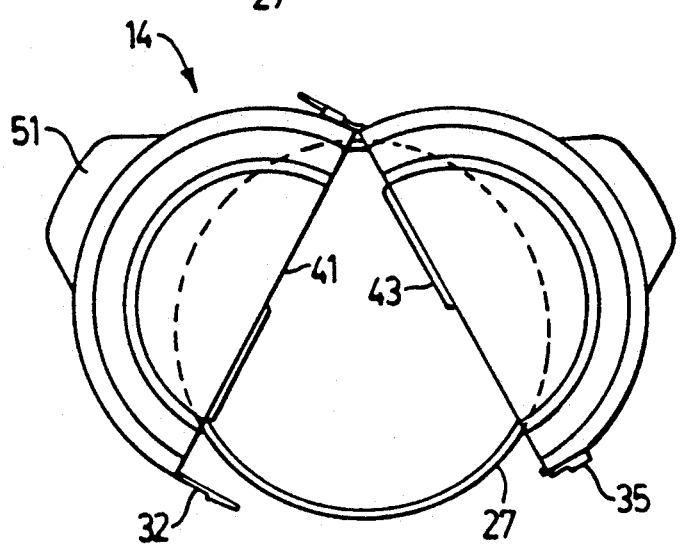
Figure 16:
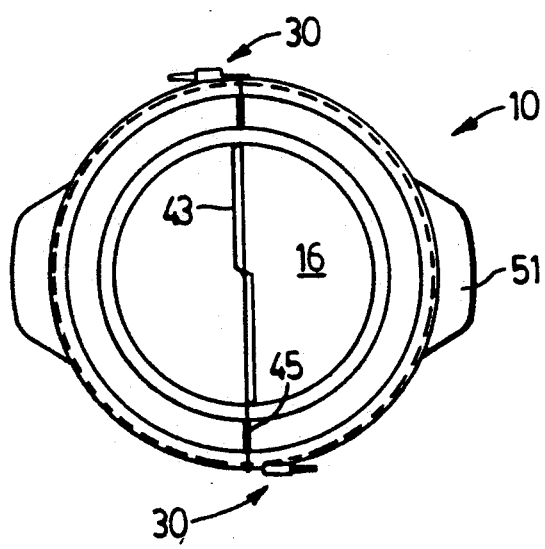

The operation of the preferred latch means 30 is further illustrated in FIGS. 14-16, where it can be seen that the interengagement of one pair of tongue 32 and receiving member 35 allows the two portions 14 of the cover 10 to be hinged together, thereby facilitating insertion of the rim 27 of the dish 12 between the flange 23 and the lip 20 prior to securement of the second pair of latch means 32 and 35.

The juxtaposed radial edges 41 of the top surfaces 16 of the portions 14 are preferably overlapped by providing a narrow flange 43 extending substantially along the length of a radial edge 41 of each portion 14 (see FIGS. 1, 4 and 13-16). These overlapping flanges 43 serve to partially seal the top surface 16 of the assembled cover 10, and provide some structural reinforcement for the top surface 16.

Figure 13:
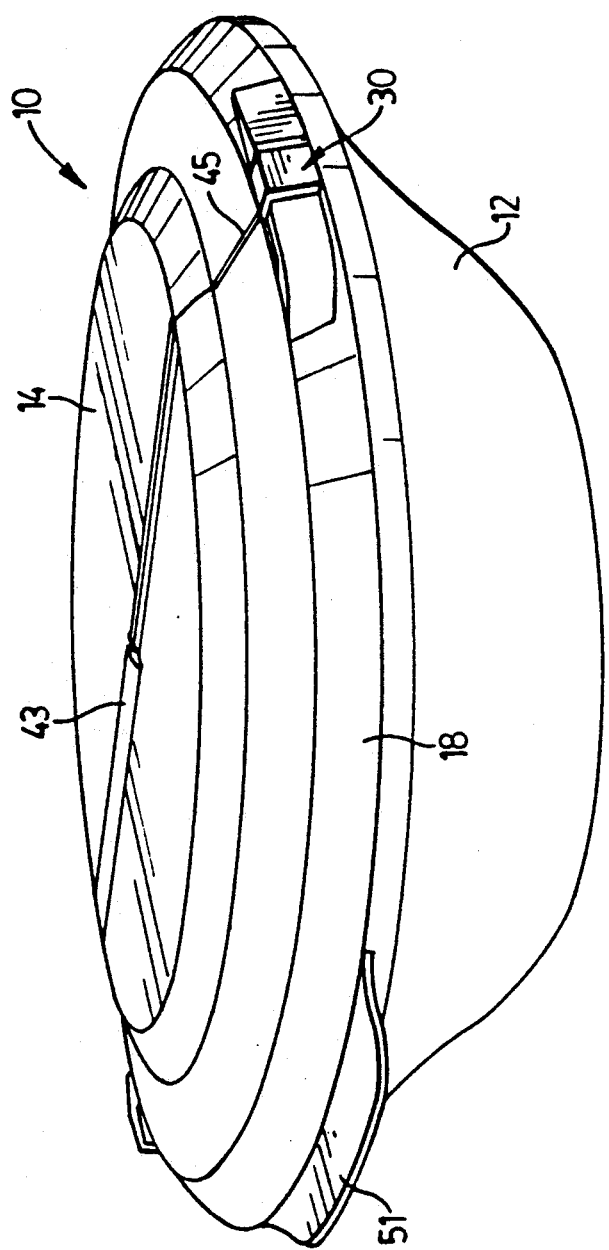
FIG. 13 is a perspective view of an alternative cover of the invention as fastened to a dish.

As microwave cooking frequently causes the evolution of steam from the food being cooked, the cover 10 is provided with vent means 45 through the top surface 16. Preferably, such vent means 45 is formed along the juxtaposed radial edges 41 of the portions 14 as shown in FIGS. 1, 13 and 16.

The cover 10 includes any of various handle means. FIGS. 13-16 show a simple handle 51 formed into the side 18 of each portion 14. One type of locking handle 53 is shown particularly in FIGS. 3a and 3b where each portion 14 has a handle member 53 which is interengageable with a like member 53 on the cojoining portion 14 at the centre of the top surface 16. As seen in FIG. 3b, each member 53 is attached to the portion 14 by a securement member 55 which lockably fastens to the handle member 53 through an opening 56 in the surface 16. Opposing handle members 53 have barbed tongues 57 which lock together when the two portions 14 are closed about a dish 12 (FIG. 2). The tongues 57 may be disengaged by using finger pressure at the area 58 of the tongue 57 to release engagement of the barbs.

An alternative locking handle 63 is shown in FIGS. 9-12 where each portion 14 has a post 64 adjacent the to center of the diametric edge. A handle 63 has two cut out portions 65 for receiving the posts 64 of adjacent portions 14. A securing clip 67 is provided to hold the handle 63 pivotally on one post 64, thereby allowing for easy engagement and release of the handle means 63.

In operation, the two portions 14 of the cover 10 are joined first at one latch means 30 and then are fit to the dish 12 by inserting the dish rim 27 between the flange 23 and lip 20. The second latch means 30 is then closed as is the locking handle 53 or 63, if present. The flange 23 is sized to extend slightly into the space above the dish so that condensate accumulation on the inner surface of the cover 10 during cooking can flow off the flange 23 back into the dish 12. Steam pressure build-up inside the covered dish 12 is avoided by the provision of the vents 45, and the handles 51, 53 or 63 in combination with the annular lip 20 allow the removal of the covered dish 12 from the oven using bare hands.

It will be appreciated from the foregoing that the invention includes variants and equivalents which would be apparent to the skilled person.

We claim:

1. A dish cover for use in a microwave oven, said cover having a generally circular shape and comprising:

first and second generally semicircular portions, each portion having a top surface from which semicircular edge depends a downwardly extending peripheral sidewall having an inwardly extending lip along its bottom edge and having an inwardly extending flange positioned between the bottom peripheral lip and top surface so that a rim of a dish may be inserted in the space defined between the flange and lip with the flange extending slightly into the space above the dish;

latch means on each first and second portion for releasably joining the two portions together so that the assembled cover may be fastened to a rim of a dish;

vent means defined through the top surface for allowing pressure equalization between the interior and exterior of the covered dish; and handle means attached to each semicircular portion which coact when the cover is assembled to facilitate manipulation of the covered dish.

2. A dish cover as claimed in claim 1, wherein the lip has sufficient weight bearing strength to support a fully loaded dish when the cover is fastened to it.

3. A dish cover as claimed in claim 1, wherein the latch means consists of a tongue and receiving member each located on an opposing semicircular portion.

4. A dish cover as claimed in claim 3, wherein each semicircular portion has a flexible barbed tongue extending tangentially from one end of the sidewall and a tongue receiving member adjacent the other end of the sidewall, the receiving member defining a slot through which the barbed end of the tongue may pass and said member having a surface for engaging the barb.

5. A dish cover as claimed in claim 4, wherein the tongue has biasing means for urging the barb into engagement with said surface of the receiving member.

6. A dish cover as claimed in claim 5, wherein the biasing means are a pair of angled elongate ribs located on the tongue surface facing the sidewall.

7. A dish cover as claimed in claim 1, wherein at least one gap is provided between opposing diametric edges of the semicircular cover portions as fastened to the rim of dish, thereby defining vent means.

8. A dish cover as claimed in claim 1, further comprising an overlapping narrow flange extending substantially along a radial edge of the semicircular portion.

9. A dish cover as claimed in claim 1, wherein the handle means is a handle extending from the sidewall of each semicircular portion.

10. A dish cover as claimed in claim 1, wherein the handle means is a locking handle comprising identical handle portions attached to the top surface of each semicircular portion adjacent the diametric edge and centrally of it, each handle portion having a barbed tongue extending beyond the edge and configured to enable interlocking with the barbed tongue of the opposing semicircular portion when the two portions are fastened to the rim of a dish.

11. A dish cover as claimed in claim 10, wherein the handle portion is structured to allow access to the tongue so that it may be disengaged from an opposing barbed tongue using finger pressure.

12. A dish cover as claimed in claim 1, wherein the handle means is a locking handle having means for engaging a structural element on the top surface of each opposing semicircular portion when the cover is fastened to the rim of a dish.

13. A dish cover as claimed in claim 12, wherein the structural element is a post and the handle has recesses for engaging posts on opposing semicircular portions.

14. A dish cover as claimed in claim 13, wherein the handle is pivotally attached to a post on one semicircular portion so that it may pivotally engage and release the post on the other opposing semicircular portion.

* * * * *